US007544313B2

(12) United States Patent
Taniguchi et al.

(10) Patent No.: US 7,544,313 B2
(45) Date of Patent: Jun. 9, 2009

(54) CAP FOR FUEL TANK COMPRISING ELECTRICALLY CONDUCTIVE RESIN COMPOSITION OF A POLYAMIDE TYPE

(75) Inventors: Akira Taniguchi, Ohtsu (JP); Satoshi Sakai, Ohtsu (JP); Hiroyuki Nakagawa, Aichi (JP); Kazuhisa Ishida, Aichi (JP); Kiyomitsu Terashima, Aichi (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 340 days.

(21) Appl. No.: 11/632,055

(22) PCT Filed: Sep. 16, 2005

(86) PCT No.: PCT/JP2005/017130

§ 371 (c)(1),
(2), (4) Date: Jan. 10, 2007

(87) PCT Pub. No.: WO2006/035619

PCT Pub. Date: Apr. 6, 2006

(65) Prior Publication Data
US 2008/0073620 A1  Mar. 27, 2008

(30) Foreign Application Priority Data
Sep. 29, 2004 (JP) ............... 2004-283833
Sep. 29, 2004 (JP) ............... 2004-283834
Sep. 30, 2004 (JP) ............... 2004-286478

(51) Int. Cl.
H01B 1/06 (2006.01)
H01B 1/12 (2006.01)
B65D 41/04 (2006.01)
B65D 55/16 (2006.01)
C08K 3/04 (2006.01)

(52) U.S. Cl. ............ 252/511; 220/288; 215/306; 524/495

(58) Field of Classification Search ........... 252/511; 220/288; 215/306; 524/495
See application file for complete search history.

(56) References Cited

U.S. PATENT DOCUMENTS

| 5,098,610 | A | * | 3/1992 | Okamura et al. ........... 252/511 |
| 5,373,046 | A | * | 12/1994 | Okamura et al. ........... 524/413 |
| 5,912,116 | A | * | 6/1999 | Caldwell ................... 435/5 |
| 5,922,811 | A | * | 7/1999 | Suzuki et al. .............. 525/240 |
| 6,197,858 | B1 | | 3/2001 | Hagano et al. |
| 6,221,283 | B1 | | 4/2001 | Dharmarajan et al. |
| 6,506,830 | B1 | * | 1/2003 | Bussi et al. ............... 524/495 |
| 6,508,275 | B1 | * | 1/2003 | Sadr et al. ................. 138/109 |
| 6,576,699 | B2 | * | 6/2003 | Nakagawa et al. ......... 524/505 |
| 6,646,047 | B2 | * | 11/2003 | Tasaka et al. ............. 525/92 B |
| 6,913,163 | B2 | * | 7/2005 | Ishida et al. .............. 220/375 |
| 7,141,624 | B2 | * | 11/2006 | Bhatt et al. ............... 524/496 |
| 2003/0173362 | A1 | * | 9/2003 | Ishida et al. .............. 220/375 |
| 2003/0235668 | A1 | * | 12/2003 | Kutsuna et al. .......... 428/35.7 |
| 2005/0147778 | A1 | * | 7/2005 | Tai et al. ................. 428/36.91 |
| 2008/0073352 | A1 | * | 3/2008 | Hagano et al. ........... 220/375 |

FOREIGN PATENT DOCUMENTS

| EP | 0 926 199 A1 | 6/1999 |
| JP | 58-093756 | 6/1983 |
| JP | 05-263560 | 10/1993 |
| JP | 11-180171 | 7/1999 |
| JP | 2002-544308 | 12/2002 |
| JP | 2003-064255 | 3/2003 |
| JP | 2004-210828 | 7/2004 |
| WO | WO 00/68299 | 11/2000 |

* cited by examiner

Primary Examiner—Douglas Mc Ginty
(74) Attorney, Agent, or Firm—Kenyon & Kenyon LLP (57) ABSTRACT

An electrically conductive resin composition of a polyamide type, characterized in that, (A) 95 to 40% by mass of polyamide resin, (B) 5 to 30% by mass of electrically conductive carbon black, (C) 10 to 40% by mass of an ethylene-α-olefin copolymer having a reactive functional group which is able to react with a terminal group of the polyamide resin and/or an amide group of the main chain and (D) 1 to 10% by mass of a high-density polyethylene resin are compounded; the polyamide resin (A) forms a continuous phase; the ethylene-α-olefin copolymer (C) in particles having an average particle diameter of not more than 2 μm is present by being dispersed in the continuous phase of the polyamide resin (A); and not less than 80% by mass of the electrically conductive carbon black (B) is present by being dispersed in the polyamide resin phase (A) which is a continuous phase, as well as a cap for fuel tank comprising it.

4 Claims, 3 Drawing Sheets

CAP FOR FUEL TANK COMPRISING ELECTRICALLY CONDUCTIVE RESIN COMPOSITION OF A POLYAMIDE TYPE

This is a U.S. national phase entry application of an international patent application, No. PCT/JP2005/017130, filed Sep. 16, 2005, which claims the priorities of Japanese Patent Application Nos. 2004-283833 and 2004-283834 filed Sep. 29, 2004 and No. 2004-286478 filed Sep. 30, 2004.

TECHNICAL FIELD OF THE INVENTION

The present invention relates to an electrically conductive resin composition of a polyamide type comprising polyamide resin, electrically conductive carbon black and olefin-type resin, as well as a process for the production thereof. The present invention also relates to a cap for fuel tank having an excellent electric conductivity and excellent impact resistance and sliding ability.

BACKGROUND ART

Polyamide resin has an excellent chemical resistance to organic solvents such as gasoline and to alkali liquids and also has a high fluidity and excellent heat resistance and creep resistance whereby it has been used as exterior materials and inner parts for engine room of automobiles. It is also compounded with carbon black or the like to bestow electric conductivity to suppress generation of static electricity and electrification and is bestowed with a function where discharge within a relatively short time is possible whereby it is used as a part for refueling system of automobile parts such as a cap for fuel tank.

However, polyamide resin has a disadvantage that changes in its size become big by absorption of water and a problem that impact strength significantly lowers by addition of carbon black or the like. It has been well known to compound the polyamide resin with carbon black for bestowing electric conductivity on polyamide resin but, when compounding amount of carbon black is increased for enhancing the electric conductivity, fluidity and physical properties of the composition are greatly deteriorated. Therefore, there has been a proposal where, in order to improve fluidity and molding property, polyamide resin is compounded with carbon black bestowing electric conductivity thereon and with a modified ethylene copolymer which suppresses dimensional change by absorption of water to enhance the impact resistance (Japanese Patent Laid-Open No. 58/093,756).

In those methods however, although fluidity and molding property are improved, improvement of impact resistance of the polyamide resin composition is insufficient. Since the impact resistance is low, it is likely that the modified ethylene copolymer dispersed in the polyamide resin composition is dispersed in a relatively big particle diameter. Accordingly, electric conductivity and impact strength which are the properties demanded for fuel tank caps are not compatible. In addition, since a modified soft ethylene copolymer is dispersed in a polyamide resin composition in a big dispersed particle diameter, although polyamide resin inherently has an excellent slidability characteristic, its sliding characteristic is significantly deteriorated in the resin composition of a polyamide type as such.

As a method in which those electric conductivity and impact resistance are made compatible, there has been a proposal for a method where a carbon black dispersing agent is compounded (Japanese Patent Laid-Open No. 11/180,171). However, that is insufficient in view of fluidity and suppression of dimensional change upon absorption of water and, moreover, there is a problem that the carbon black dispersing agent soils the metal mold upon a molding processing.

DISCLOSURE OF THE INVENTION

Problem that the Invention is to Solve

The present invention has been created in view of the above-mentioned current status of the prior art and its object is, in an electrically conductive polyamide resin composition in which carbon black is compounded with a polyamide resin, to provide a polyamide resin composition which is able to provide a molded product having electric conductivity, high impact strength and excellent sliding characteristic by specifying the composition and the morphology structure and also to provide a process for producing the same and to provide a cap for fuel tank comprising the same.

Means for Solving the Problems

The present inventors have carried out intensive studies for solving the above-mentioned problems and found that the problems are able to be solved by an electrically conductive resin composition where electrically conductive carbon black is dispersed in polyamide resin, an ethylene-α-olefin copolymer having a reactive functional group which is able to react with the polyamide resin is dispersed in the polyamide resin in an average particle diameter of not more than 2 μm and a high-density polyethylene is compounded therewith whereupon the present invention has been accomplished.

Thus, the present invention is an invention mentioned in the following (1) to (7).

(1) An electrically conductive resin composition of a polyamide type, characterized in that, (A) 95 to 40% by mass of polyamide resin, (B) 5 to 30% by mass of electrically conductive carbon black, (C) 10 to 40% by mass of an ethylene-α-olefin copolymer having a reactive functional group which is able to react with a terminal group of the polyamide resin and/or an amide group of the main chain and (D) 1 to 10% by mass of a high-density polyethylene resin are compounded; the polyamide resin (A) forms a continuous phase; the ethylene-α-olefin copolymer (C) in particles having an average particle diameter of not more than 2 μm is present by being dispersed in the continuous phase of the polyamide resin (A); and not less than 80% by mass of the electrically conductive carbon black (B) is present by being dispersed in the polyamide resin phase (A) which is a continuous phase.

(2) The electrically conductive resin composition of a polyamide type mentioned in (1), wherein volume intrinsic resistivity of the electrically conductive resin composition of a polyamide type is not more than $1 \times 10^{11}$ Ω.cm and Izod impact strength thereof is not less than 300 J/m.

(3) The electrically conductive resin composition of a polyamide type mentioned in (1) or (2), wherein Taber's abrasion value of the electrically conductive resin composition of a polyamide type is not more than 25 mg.

(4) A process for the production of electrically conductive resin composition of a polyamide type where (A) 95 to 40% by mass of polyamide resin, (B) 5 to 30% by mass of electrically conductive carbon black, (C) 10 to 40% by mass of an ethylene-α-olefin copolymer having a reactive functional group which is able to react with a terminal group of the polyamide resin and/or an amide group of the main chain and (D) 1 to 10% by mass of a high-density polyethylene resin are compounded, characterized in that, the polyamide resin (A) and the electrically conductive carbon black (B) are previously melted and kneaded and then the ethylene-α-olefin copolymer (C) and the high-density polyethylene resin (D) are further melted and kneaded therewith.

(5) A cap for fuel tank, characterized in that, the cap comprises an electrically conductive resin composition of a polyamide type in which a polyamide resin (A), electrically conductive carbon black (B), an ethylene-α-olefin copolymer having a reactive functional group which is able to react with a terminal group of the polyamide resin and/or an amide group of the main chain (C) and a high-density polyethylene resin (D) are compounded, the polyamide resin (A) forms a continuous phase, the ethylene-α-olefin copolymer (C) in particles having an average particle diameter of not more than 2 μm is present in the continuous phase of the polyamide resin (A) as a dispersed phase and not less than 80% by mass of the electrically conductive carbon black (B) is present by being dispersed in the polyamide resin phase which is a continuous phase.

(6) The cap for fuel tank mentioned in (5), wherein, with regard to the electrically conductive resin composition of a polyamide type, volume intrinsic resistivity of molded product obtained from said resin composition is not more than $1 \times 10^{11}$ Ω·cm and Izod impact strength thereof is not less than 300 J/m.

(7) The cap for fuel tank mentioned in (5) or (6), wherein, with regard to the electrically conductive resin composition of a polyamide type, Taber's abrasion value of molded product obtained from said resin composition is not more than 25 mg.

Advantages of the Invention

In the electrically conductive resin composition of the present invention, carbon black is compounded with a polyamide resin to bestow electric conductivity and also to improve the molding property whereby excellent impact resistance and sliding characteristics are retained. The electrically conductive resin composition having such good characteristics is able to be suitably used for parts of fuel system of automobiles such as cap, strainer, filter and valve of fuel tank. Therefore, it greatly participates in industry. In addition to chemical resistance and heat resistance of polyamide, the cap for fuel tank according to the present invention has excellent impact resistance and sliding characteristic and also has electric conductivity whereby static electricity charged to human body or clothing can be surely discharged within a predetermined time.

BRIEF DESCRIPTION OF THE DRAWINGS

FIG. 3 is a cross-sectional illustrative drawing for an example of common caps used in a fuel tank of automobiles or the like.

FIG. 4 is a cross-sectional illustrative drawing for an example of common caps used in a fuel tank of automobiles or the like.

FIG. 5 is a cross-sectional illustrative drawing for an example of common caps used in a fuel tank of automobiles or the like.

EXPLANATION OF REFERENCE SIGNS IN DRAWINGS

1a: polyamide resin (continuous phase)
2a: carbon black
3a: particles of modified ethylene-α-olefin copolymer (dispersed phase)
1b: polyamide resin (continuous phase)
2b: carbon black
3b: particles of modified ethylene-α-olefin copolymer dispersed phase)
1: filler neck
2: cap
3: closure made of resin
4: tubular part
5: screw part
6: flange part
7: seal ring
8: top plate part
9: dew passing hole
10: valve
11: valve-holding plate
12: coil spring
13: plate for spring stand
14: shell made of resin
15: fuel rid
16: installing metal plate
17: installing hole
18: body of automobile
19: feeding opening for fuel
20: main body of automobile
23: retainer
23a: engaging part (mortise)
23b: ring member
26: string-shaped electrically conductive material
34a: engaging part (tenon)

Best Mode for Carrying Out the Invention

The present invention will now be specifically illustrated as hereunder.

The electrically conductive resin composition of a polyamide type in accordance with the present invention is able to be utilized in various fields such as a cap for fuel tank in which its characteristic is mostly in its constituting material and there is no particular limitation for the structure of the cap.

The polyamide resin (A) of the present invention is that which has an acid amide bond (—CONH—) in a molecule and its specific examples are polymer or copolymer prepared from ε-caprolactam, 6-aminocaproic acid, ω-enantolactam, 7-aminoheptanoic acid, 11-aminoundecanoic acid, 9-aminononanoic acid, α-pyrrolidone, α-piperidine, etc. or a blended product thereof; and polymer or copolymer of a diamine such as hexamethylenediamine, nonamethylenediamine, undecamethylenediamine, dodecamethylenediamine and m-xylylenediamine with a dicarboxylic acid such as terephthalic acid, isophthalic acid, adipic acid and sebacic acid or a blended product thereof although they are non-limitative.

With regard to number-average molecular weight of such a polyamide resin, that of 7,000 to 30,000 is preferably used. When the number-average molecular weight is less than 7,000, toughness lowers while, when it is more than 30,000, fluidity lowers and they are not preferred. With regard to a compounding amount of the polyamide resin (A), it is 95 to 40% by mass and, more preferably, 90 to 50% by mass. When the polyamide resin is less than 40% by mass, a morphology structure where the polyamide resin is to be a continuous phase in a fine structure of molded product comprising the electrically conductive composition of a polyamide type becomes unstable and that is not preferred.

With regard to the electrically conductive carbon black (B) of the present invention, there is no particular limitation and it is possible to use Ketjenblack, acetylene black, furnace black and channel black. Among them, Ketjenblack is particularly preferred since an excellent electric conductivity is achieved by a small compounding amount. Although the compounding amount of the electrically conductive carbon black (B) may vary depending upon the aimed electric conductivity, it is advantageous to be 30 to 5% by mass.

It is necessary that not less than 80% by mass of the compounding amount of such an electrically conductive carbon black is dispersed in the polyamide resin forming a continuous phase of the electrically conductive resin composition of a polyamide type. For such a purpose, a kneading step is very important and, at the same time, functional groups such as carboxyl group and hydroxyl group existing on the surface of particles of carbon black are also important. When a sufficient kneading is conducted in the kneading step, functional group on the surface of carbon black actions whereby affinity to the polyamide resin increases and dispersing into the continuous phase of the polyamide resin is apt to take place. In the present invention, there is no particular limitation for the kneading condition and the concentration of functional group existing on the surface of carbon black and, in a molded product of the electrically conductive resin composition of a polyamide type, it is important that not less than 80% by mass of the compounding amount of carbon black is dispersed in the polyamide resin which is a continuous phase. As a result of dispersing of carbon black as such, a composition having an electric conductivity where volume intrinsic resistivity is as good as not more than $1\times10^{11}$ $\Omega$.cm is prepared and, at the same time, physical properties such as impact strength and abrasion resistance become good.

With regard to the ethylene-α-olefin copolymer (C) having a functional group which is able to react with a terminal group of the polyamide resin and/or an amide group of the main chain in accordance with the present invention, its examples are an ethylene/propylene copolymer, an ethylene/propylene/diene copolymer, an ethylene/butane-1 copolymer, an ethylene/octene-1 copolymer, an ethylene/hexene-1 copolymer, an ethylene/4-methylpentene-1 copolymer and an ethylene/cyclic olefin copolymer although they are non-limitative. Compounding amount of the ethylene-α-olefin copolymer (C) is preferred to be 10 to 40% by mass. When the compounding amount is less than 10% by mass, impact strength of the electrically conductive resin composition of a polyamide type lowers. When it is more than 40% by mass, elasticity and strength of the composition become significantly low and, further, abrasion resistance is deteriorated as well whereby that is not preferred.

The functional group which is able to react with the terminal group of the polyamide resin and/or an amide group of the main chain in the ethylene-α-olefin copolymer (C) of the present invention is a functional group which is able to react with an amino group or a carboxyl group which is a terminal group of the polyamide resin and/or an amide group of the main chain. To be more specific, its examples are carboxylic acid group, acid anhydride group, epoxy group, oxazoline group, amino group and isocyanate group and, among them, acid anhydride group has the best reactivity and is preferred.

With regard to the quantity of the functional group, it goes without saying that, when it is abundant, the reaction with the polyamide resin proceeds more, the ethylene-α-olefin copolymer is dispersed in the continuous phase of the polyamide resin in finer particle diameter and impact resistance of the composition is enhanced as well. With regard to a process for the production of an ethylene-α-olefin copolymer having such a functional group, there are a method where a compound having the above functional group is made to react during the step for the production of the copolymer, a method where pellets of the copolymer and the compound having a functional group are mixed and made to react by kneading using an extruder or the like, etc. although they are non-limitative.

It is important that the ethylene-α-olefin copolymer (C) of the present invention is in a form of particles having an average particle diameter of not more than 2 μm and has a morphology structure being dispersed in the polyamide resin which is a continuous phase. The above-mentioned morphology structure is achieved by the reaction of the polyamide resin with the ethylene-α-olefin copolymer in the process for the manufacture of the composition. When the ethylene-α-olefin copolymer is finely dispersed in an average particle diameter of not more than 2 μm into the polyamide resin, a high impact characteristic where Izod impact strength is not less than 300 J/m is achieved and a composition in which lowering of an excellent sliding characteristic of the polyamide resin is little is prepared.

The high density polyethylene (D) of the present invention is polyethylene where density is not less than 0.96 and there is no other particular limitation. Compounding amount of the high density polyethylene (D) is preferably 1 to 10% by mass. When the compounding amount is less than 1% by mass, an effect of improving the abrasion is little while, when it is more than 10% by mass, strength and impact resistance of the composition are deteriorated and they are not preferred. In the composition of the present invention, the high density polyethylene and the ethylene-α-olefin copolymer dispersed in the polyamide resin are an olefin resin of the same type and have good affinity. Therefore, their dispersing property in the composition is good and the electrically conductive resin composition of a polyamide type in which highly crystalline high density polyethylene is finely dispersed achieves an excellent sliding property where Taber's abrasion value is not more than 25 mg.

In a cap for fuel tank comprising the electrically conductive resin composition of a polyamide type according to the present invention, its morphology structure is very important. The polyamide resin constitutes a continuous phase which becomes a matrix and a dispersed average particle diameter of an ethylene-α-olefin copolymer finely dispersed by the reaction with the polyamide resin is not more than 2 μm. Further, with regard to carbon black, not less than 80% by mass of the compounding amount is dispersed in the polyamide resin which is a continuous phase due to the kneading condition and the functional group existing on the surface of particles. In addition, the high density polyethylene is able to be uniformly dispersed due to affinity for the finely dispersed ethylene-α-olefin copolymer. As a result of the morphology structure as such, volume intrinsic resistivity of a molded product prepared from the resin composition is not more than $1\times10^{11}$ $\Omega$.cm, Izod impact strength is not less than 300 J/m and Taber's abrasion value is not more than 25 mg whereby a cap for fuel tank having an excellent electric conductivity and high impact resistance and sliding characteristic is prepared. For making severer use possible, it is more preferable that volume intrinsic resistivity of a molded product prepared from the electrically conductive resin composition of a polyamide type is not more than $1\times10^9$ Ω.cm, Izod impact strength is not less than 500 J/m and Taber's abrasion value is not more than 22 mg.

Besides the above-mentioned (A), (B), (C) and (D), the electrically conductive resin composition of a polyamide type according to the present invention may be also compounded with copper oxide and/or alkali metal halide which are/is weather resistance improving agent(s) used for common resin composition of a polyamide type, antioxidant of a phenol type and antioxidant of a phosphorus type as a stabilizer for light or heat, releasing agent, crystal nucleus agent, lubricant, pigment, dye, etc.

With regard to the electrically conductive resin composition of a polyamide type used for a cap of fuel tank according to the present invention, it is not possible to form a stable morphology structure by mere mixing of each component followed by kneading using an extruder and it is recommended to knead by a special method. A specific method for the manufacture of the electrically conductive resin composition of a polyamide type according to the present invention is that a polyamide resin (A) and an electrically conductive carbon black (B) are melted and kneaded in a melting kneader (such as a biaxial extruder, a pressurizing kneader, a uniaxial extruder and a melting reactor) so as to make the electrically conductive carbon black uniformly dispersed in the polyamide resin and then a modified ethylene-α-olefin copolymer (C), a high density polyethylene (D) and other additives if necessary are added thereto followed by subjecting to a further melting/kneading. As a result of conducting the melting/kneading in two steps as such, an electrically conductive resin composition of a polyamide type having a morphology structure according to the present invention is able to be manufactured in a stable manner. However, the method of manufacturing the electrically conductive resin composition of a polyamide type according to the present invention is not limited to such a specific blending and melting/kneading method but any other blending and melting method may be used to manufacture the composition of the present invention so far as the above-mentioned composition and morphology structure are able to be achieved. For example, in a biaxial extruder of a vent type having a supplying inlet in a middle part, the polyamide resin (A) and the electrically conductive carbon black (B) are poured into a hopper which is a main supplying inlet followed by melting and kneading while the ethylene-α-olefin copolymer (C) having a functional group, the high density polyethylene (D), etc. are poured into a vent inlet which is a supplying inlet in the middle part of the biaxial extruder followed by melting and kneading whereupon the composition of the present invention is able to be manufactured by a series of continuous melting and kneading. Specific manufacturing method thereof is not limited to the methods mentioned here but the composition of the present invention is able to be manufactured by any other method so far as it is a manufacturing method where the electrically conductive carbon black is finely dispersed in a polyamide resin as mentioned before.

EXAMPLES

Now, the present invention will be further illustrated by way of the following Examples although the present invention is not limited by those Examples at all.

Each of characteristics and physical data shown in the following Examples and Comparative Examples were measured by the following test methods. The test piece was molded by the following condition using an injection molding machine (IS 80 manufactured by Toshiba Kikai).

Resin temperature: 275° C.
Metal mold temperature: 40° C.
Injection pressure: 50 kg/cm$^2$
Injection time: 1 second
Retention pressure: 60 kg/cm$^2$
Retention time: 6 seconds 1. Volume intrinsic resistivity: Terminals were connected to both ends which were at right angles to the gate of a plate of 100 mm×100 mm×2 mm thickness prepared by injection molding and measurement was conducted using a digital multimeter (TR-6843 manufactured by Advantest).

Incidentally, the test piece for the test was dried in vacuo at 70° C. for 12 hours, then seasoned in an atmosphere of 20° C. and 50% $R^H$ for 24 hours and subjected to the measurement.

2. Izod impact strength: Measured in accordance with ASTM D256 (with notch)

3. Taber's abrasion: Measured in accordance with JIS K 7204 (abrasion ring: CS17; load: 1,000 g; revolutions: 1,000 cycles)

4. Observation of morphology structure: Frozen pieces were prepared from the central part of a plate of 100 mm×100 mm×2 mm thickness obtained by injection molding.

In the measurement of average particle diameter, a frozen piece having a cross section being vertical to the direction of the resin flow of the sample was prepared, stained with a 5% aqueous solution of phosphotungstic acid, then subjected to vapor deposition with carbon and observed under a transmission electron microscope (JEM 2010 manufactured by Nippon Denshi) with accelerating voltage of 200 kV and direct magnification of 5.000-fold to take pictures. After that, the resulting photographic picture was subjected to an image analyzer to determine the average particle diameter. When the observed image of the domain was elliptic in this device, diameter calculated as a sphere was adopted as a particle diameter.

With regard to the existing places of carbon black, particle numbers of all carbon black existing in the resulting picture and particle numbers of carbon black existing in the continuous phase or the dispersed phase were counted by an image analyzer and percentage of the particle numbers of carbon black existing in the continuous phase was adopted as % by mass.

With regard to the starting materials of the composition used in Examples and Comparative Examples, the following materials were used.

(A) Toyobo Nylon T-840 (Nylon 6 manufactured by Toyobo; relative viscosity: 2.2)

(B) As to the carbon black, the following two were used.

B-1: Furnace carbon C 100 (manufactured by Lion)

B-2: Ketjen carbon EC (manufactured by Lion)

(C) All of the modified ethylene-α-olefin copolymers were prepared by being modified with maleic acid anhydride and the following two were used.

C-1: Tafmer® MH 5010 (manufactured by Mitsui Chemicals)

C-2: Tafmer® MH 5020 (manufactured by Mitsui Chemicals)

(D) As to the high density polyethylene, the following material was used.

D: High density polyethylene MME 001 (manufactured by Mitsui Chemicals)

Examples 1 to 3 and Comparative Examples 1 and 2

Examples 1 to 3 and Comparative Examples 1 and 2 are as follows.

The manufacturing method of Examples 1 to 3 is that, in a first kneading step, the materials in a composition ratio of Table 1 were weighed, blended and melted/kneaded using a biaxial extruder (PCM 30 manufactured by Ikegai Tekko) where temperature of a cylinder was set at 260° C. to give pellets. Then the materials in a composition ratio of Table 1 were weighed and blended with the pellets in a second kneading step and subjected to melting/kneading using a biaxial extruder which was set at 260° C. the same as in the first step to give an electrically conductive resin composition of a polyamide type. On the other hand, in Comparative Examples 1 and 2, no first step was conducted but all material components in a composition ratio of Table 1 were weighed and blended in the second kneading step only and subjected to melting/kneading using a biaxial extruder which was set at 260° C. the same as before to give an electrically conductive resin composition of a polyamide type.

strength and Taber's abrasion value were greatly different. In the morphology structure of Comparative Example 1, carbon black was dispersed in both components of a continuous phase of polyamide resin and a dispersed phase of ethylene-α-olefin copolymer and dispersed particle diameter of the ethylene-α-olefin copolymer was big as well. It is likely that, due to the morphology structure as such, Izod impact strength and Taber's abrasion value became bad. It is presumed that, in a kneading step, some action took place between functional group of the ethylene-α-olefin copolymer and carbon black and activity of the functional group of the ethylene-α-olefin copolymer was lost and, as a result, its ratio of the reaction with polyamide which is to be made to react inherently decreased whereby impact strength and abrasion property of the polyamide resin composition were significantly deteriorated. As will be apparent from Examples and Comparative Examples, the electrically conductive resin composition of a polyamide type having a morphology structure according to the present invention is able to have excellent electric conductivity, high impact strength and excellent Taber's abrasion value.

TABLE 1

| | | Compositions/Properties | Ex. 1 | Ex. 2 | Ex. 3 | Comp. Ex. 1 | Comp. Ex. 2 |
|---|---|---|---|---|---|---|---|
| First Kneading Step | A | Nylon 6 | 54 | 44 | 40 | — | — |
| | B-1 | Furnace Carbon | — | 19 | — | — | — |
| | B-2 | Ketjen Carbon | 10 | — | 6 | — | — |
| Second Kneading Step | A | Nylon 6 | 13 | 9 | 27 | 67 | 67 |
| | B-1 | Furnace Carbon | — | — | — | — | — |
| | B-2 | Ketjen Carbon | — | — | — | 10 | 6 |
| | C-1 | Modified α-Olefin Copolymer ① | 20 | — | 24 | 20 | 24 |
| | C-2 | Modified α-Olefin Copolymer ② | — | 25 | — | — | — |
| | D | Modified High Density Polyethylene | 3 | 3 | 3 | 3 | 3 |
| Morphology Structure | | Existing Rate of Component (B) in Phase (A) (mass %) | 95 | 93 | 96 | 48 | 57 |
| | | Average Particle Diameter of Component (C) (μm) | 0.7 | 0.9 | 0.7 | 2.8 | 2.5 |
| Properties of Resin Composition | | Volume Intrinsic Resistivity (Ω·cm) | $2 \times 10^2$ | $2 \times 10^2$ | $5 \times 10^5$ | $8 \times 10^3$ | $2 \times 10^9$ |
| | | Izod Impact Strength (J/m) | 524 | 780 | 820 | 197 | 227 |
| | | Taber's Abrasion Value (mg) | 20 | 21 | 17 | 40 | 30 |

(Notes)
All material ratios are in % by mass.
A, B, C and D each is the reference letter for each composing component in the text.

Figure 1:
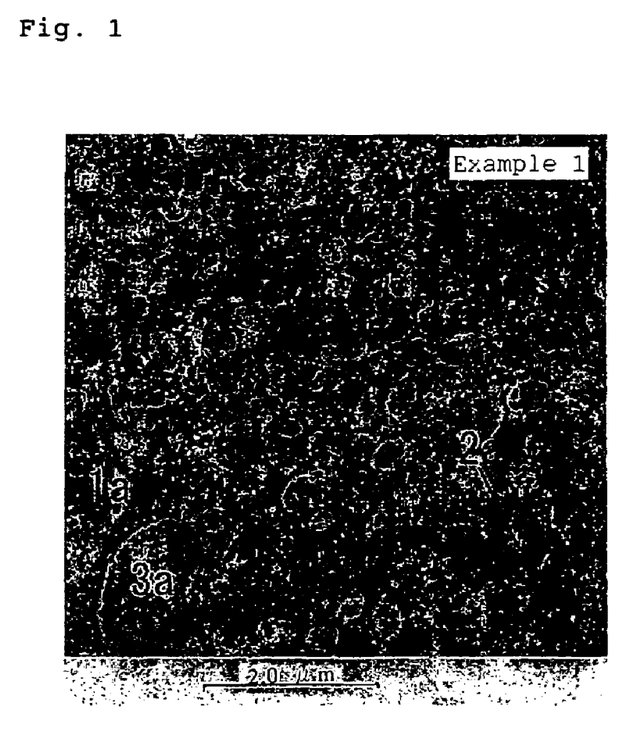
FIG. 1 is an electron microphotograph of the electrically conductive resin composition of a polyamide type in accordance with the present invention.

In Examples 1 to 3, the polyamide resin and carbon black were melted and kneaded by means of the first kneading step so that carbon black was dispersed in the polyamide resin which is to become a continuous phase in a morphology structure. After that, the modified ethylene-α-olefin copolymer and the high density polyethylene were melted and kneaded by means of the second kneading step so that the morphology structure of the present invention was able to be achieved. In the polyamide resin compositions as such, high impact strength and excellent Taber's abrasion value were achieved together with a good electric conductivity. FIG. 1 shows photographic pictures of the morphology structure as such under an electron microscope. It was noted that nearly all of carbon black was dispersed in the polyamide resin phase and that the modified ethylene-α-olefin copolymer was uniformly dispersed in an average particle diameter of not more than 2 μm.

Figure 2:
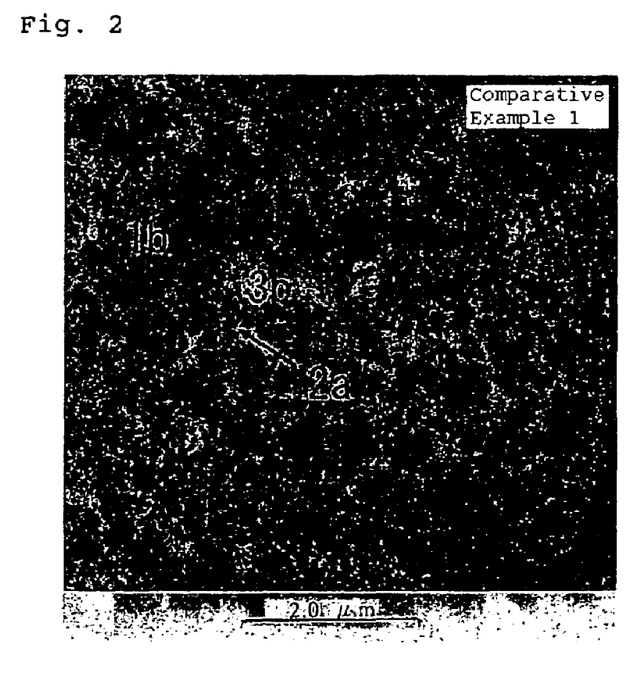
FIG. 2 is an electron microphotograph of the electrically conductive resin composition of a polyamide type of Comparative Example 1.

On the other hand, when all composing components were blended and melted/kneaded at the same time in Comparative Examples 1 and 2, the morphology structure of the present invention was unable to be achieved. The particularly noteworthy point is that, although Example 1 and Comparative Example 1 are in the same composition, their Izod impact <Preparation of Cap for Fuel Tank>

Figure 3:
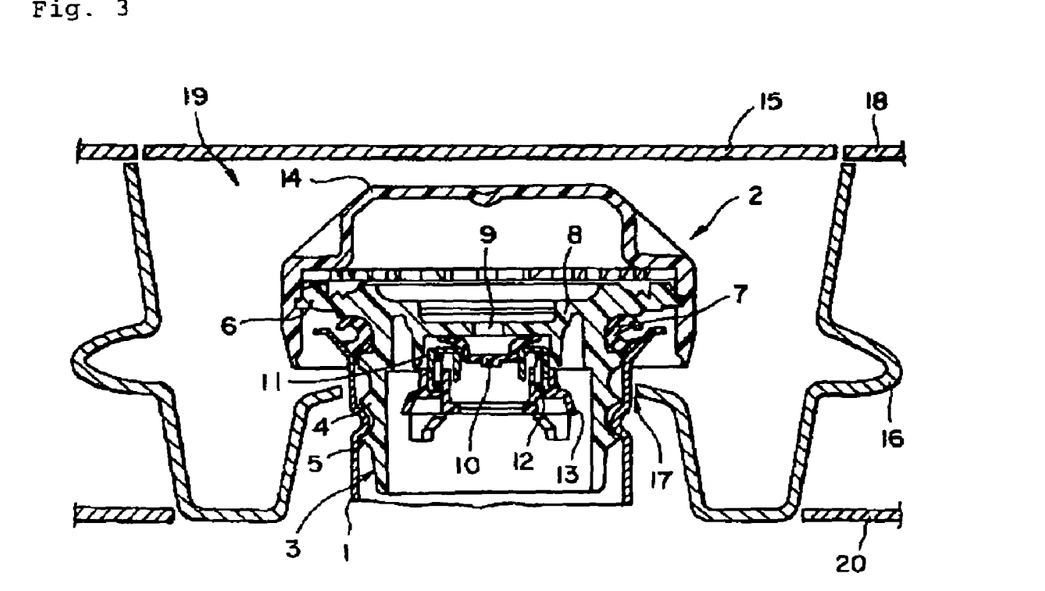
Figure 4:
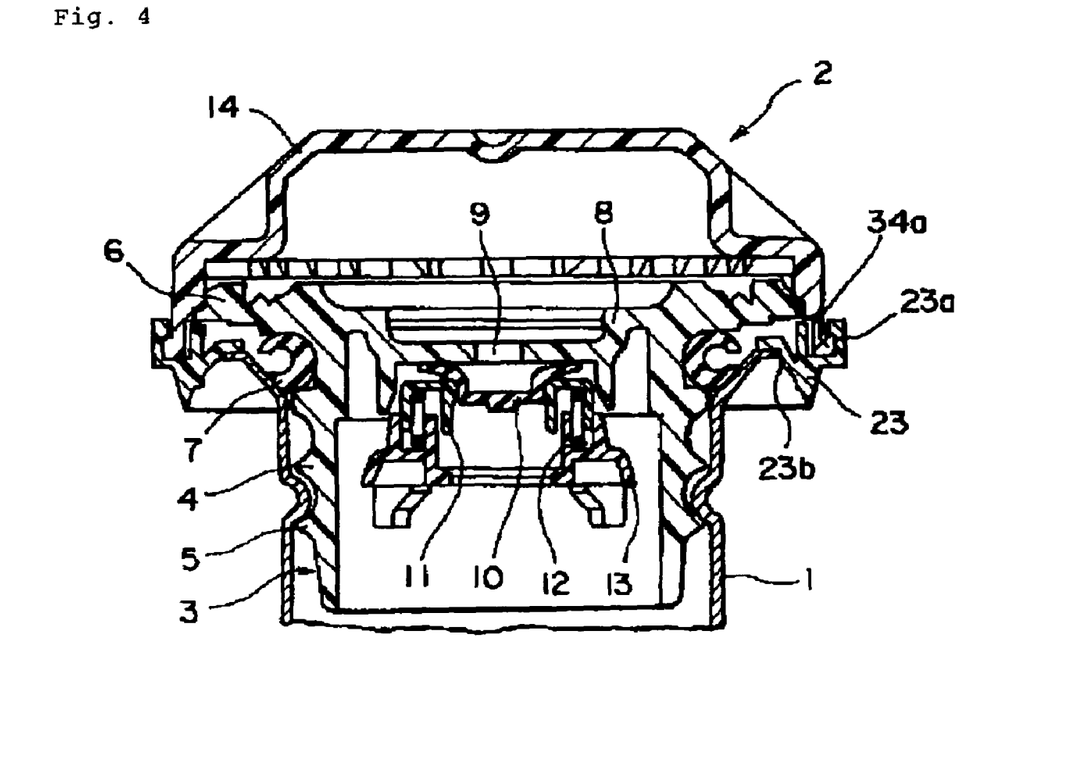
Figure 5:
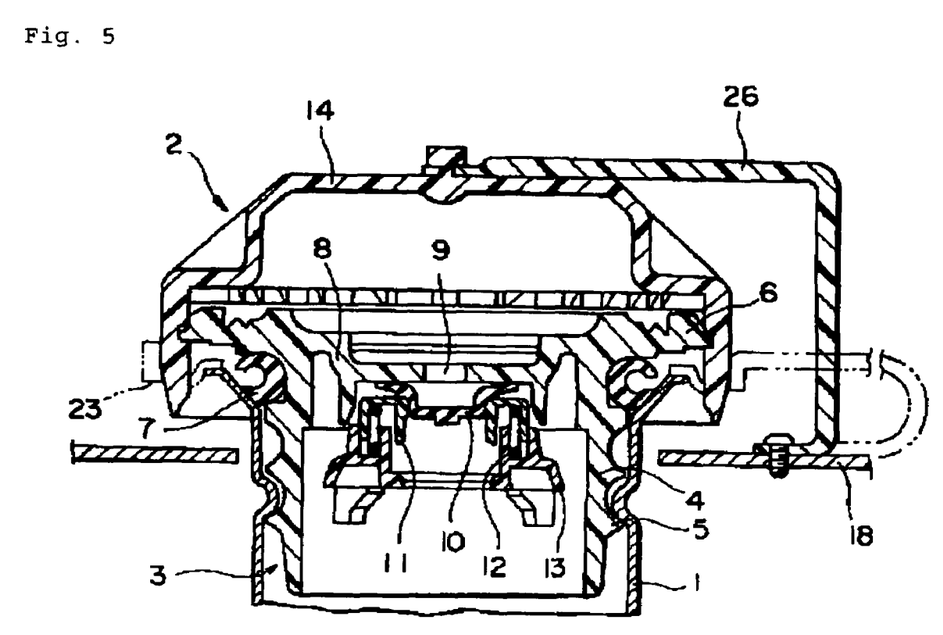

The pellets of electrically conductive resin composition of a polyamide type prepared in each of Examples 1 to 3 and Comparative Examples 1 and 2 were used and both closure made of resin and shell made of resin for cap for fuel tank (refer to FIG. 3) mainly constituted from filler neck, closure made of resin and shell made of resin were prepared by injection molding (using an injection molding machine IS80 made by Toshiba Kikai). The molding condition was as mentioned below.

Figure 6:
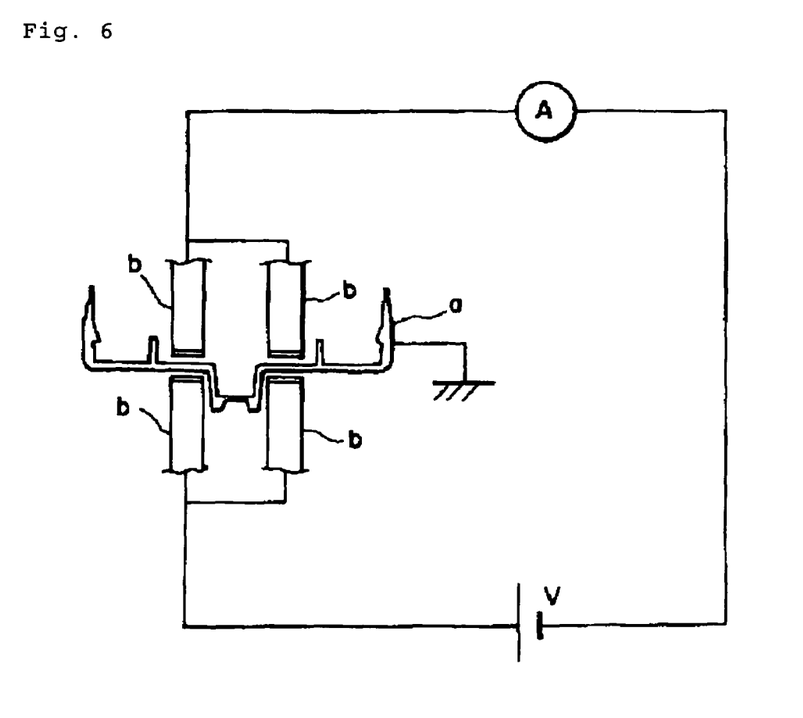
FIG. 6 is an illustrative drawing for measurement of volume intrinsic resistivity of shell (outer) made of resin in accordance with ASTM D257.

Resin temperature: 275° C.
Metal mold temperature: 40° C.
Injection pressure: 50 kg/cm²
Injection time: 1 second
Retention pressure: 60 kg/cm²
Retention time: 6 seconds As to the above-mentioned shell (outer) made of resin, its volume intrinsic resistivity was measured. Thus, as shown in FIG. 6, the outer (a) was sandwiched by encountering electrodes (b) adhered with electrically conductive rubber sheets of not more than 100Ω at front ends, a high resistance meter (R-8340 manufactured by Advantest) was connected to both electrodes and volume intrinsic resistivity was measured with applied voltage of 500 V. As a result, the outer using the pellets of electrically conductive resin composition of a polyamide type for the cap according to the present invention prepared in Example 1 to 3 had a sufficient volume intrinsic resistivity ($1\times10^2$ to $1\times10^9$ Ω.cm) for a cap of fuel tank showing a good property.

Examples 1' and 2' and Comparative Examples 1' to 3'

The manufacturing method of Examples 1' and 2' and Comparative Examples 2' and 3, is that, in a first kneading step, the materials in a composition rate of Table 2 were weighed, blended and melted/kneaded using a biaxial extruder (PCM 30 manufactured by Ikegai Tekko) where the cylinder temperature was set at 260° C. to give pellets. Then, the materials in a composition ratio of Table 2 were weighed and blended with the pellets in a second kneading step and melted and kneaded using a biaxial extruder set at 260° C. to give an electrically conductive resin composition of a polyamide type. On the other hand, in Comparative Example 1', all materials in a composition ratio of Table 2 were weighed and blended in the second kneading step and subjected to melting and kneading using the biaxial extruder set at 260° C. the same as above to give an electrically conductive resin composition of a polyamide type.

[Table 2]

followed by melting and kneading whereby functional group existing on the surface of particles of electrically conductive carbon black (B) reacted with ethylene-α-olefin copolymer (C) to which functional group was imparted during melting and kneading and activity of the functional group imparted to the ethylene-α-olefin copolymer was lost and, as a result, its ratio of the reaction with polyamide which was to be made to react inherently decreased whereby impact strength and abrasion property of the polyamide resin composition were significantly deteriorated.

Further in Comparative Example 2', no high density polyethylene (D) is compounded and, therefore, Taber's abrasion value greatly decreases. When a compounding amount of the ethylene-α-olefin copolymer (C) having a functional group is made small in Comparative Example 3', it goes without saying that impact strength of the composition lowers.

As will be apparent from Examples and Comparative Examples, the electrically conductive resin composition of a polyamide type manufactured by the manufacturing method of the present invention is able to have excellent electric conductivity, high impact strength and excellent Taber's abrasion value.

INDUSTRIAL APPLICABILITY

The resin composition of a polyamide type according to the present invention has excellent electric conductivity, excel-

TABLE 2

| | | Compositions/Properties | Ex. 1' | Ex. 2' | Comp. Ex. 1' | Comp. Ex. 2' | Comp. Ex. 3' |
|---|---|---|---|---|---|---|---|
| First Kneading Step | A | Nylon 6 | 54 | 44 | — | 44 | 54 |
| | B-1 | Furnace Carbon | — | 19 | — | 19 | — |
| | B-2 | Ketjen Carbon | 10 | — | — | — | 10 |
| Second Kneading Step | A | Nylon 6 | 13 | 9 | 67 | 9 | 28 |
| | B-2 | Ketjen Carbon | — | — | 10 | — | — |
| | C-1 | Modified α-Olefin Copolymer ① | 20 | — | 20 | — | 5 |
| | C-2 | Modified α-Olefin Copolymer ② | — | 25 | — | 28 | — |
| | D | Modified High Density Polyethylene | 3 | 3 | 3 | — | 3 |
| Manufacturing Method of the Composition | | | Double Kneading Manufacture | Double Kneading Manufacture | Single Kneading Manufacture | Double Kneading Manufacture | Double Kneading Manufacture |
| Properties | Volume Intrinsic Resistivity (Ω · cm) | | $2\times10^2$ | $2\times10^2$ | $8\times10^3$ | $4\times10^2$ | $2\times10^4$ |
| | Izod Impact Strength (J/m) | | 524 | 780 | 197 | 790 | 80 |
| | Taber's Abrasion Value (mg) | | 20 | 21 | 40 | 35 | 15 |

(Notes)
All material ratios are in % by mass.
A, B, C and D each is the reference letter for each composing component in the text.

In Examples 1' and 2', polyamide resin and carbon black were melted and kneaded in the first kneading step so that carbon black was dispersed in a polyamide resin which is to become a continuous phase and, after that, modified ethylene-α-olefin copolymer and high density polyethylene were melted and kneaded in the second kneading step. In the composition manufactured by such a manufacturing method, high impact strength and excellent Taber's abrasion value were achieved together with electric conductivity.

On the other hand, in Comparative Example 1', all composing components were blended, melted and kneaded at the same time. A particularly noteworthy point is that, although Example 1' and Comparative Example 1' are in the same composition, Izod impact strength and Taber's abrasion value were greatly different. It is presumed that, in Comparative Example 1', all components were mixed at the same time lent impact resistance and sliding characteristic. The electrically conductive resin composition having such good characteristics is able to be used as parts for fuel system of automobiles such as cap, strainer, filter and valve of fuel tank in broad areas and greatly contributes in industry. Particularly, a cap for fuel tank according to the present invention has excellent mechanical characteristics such as Izod impact strength and Taber's abrasion and has excellent processing ability for molding and, further, it is able to surely discharge the static electricity charged to human body or clothing within a predetermined time.

The invention claimed is:
1. A cap for fuel tank, wherein the cap comprises an electrically conductive resin composition of a polyamide type, the electrically conductive resin composition comprising the following components compounded:

a polyamide resin (A) forming a continuous phase, electrically conductive carbon black (B), wherein not less than 80% by mass of the electrically conductive carbon black (B) is dispersed in the continuous phase of the polyamide resin, particles of an ethylene-α-olefin copolymer (C) having a reactive functional group which is able to react with a terminal group of the polyamide resin and/or an amide group of the main chain of the polyamide resin, wherein the particles of the ethylene-α-olefin copolymer (C) have an average particle diameter of not more than 2 μm and are dispersed in the continuous phase of the polyamide resin (A), and a high-density polyethylene resin (D).

2. The cap for fuel tank according to claim 1, wherein a molded product obtained from the electrically conductive resin composition has volume intrinsic resistivity of not more than $1\times10^{11}$ Ω.cm and Izod impact strength of not less than 300 j/m.

3. The cap for fuel tank according to claim 1, wherein the molded product obtained from the electrically conductive resin composition has a Taber's abrasion value of not more than 25 mg.

4. The cap for fuel tank according to claim 2, wherein the molded product obtained for the electrically conductive resin composition has a Taber's abrasion value of not more than 25 mg.

* * * * *